May 4, 1965 M. DVORIN 3,181,872

RECORD CHANGER CONTROL ASSEMBLY

Filed July 9, 1962 2 Sheets-Sheet 1

INVENTOR.
MARTIN DVORIN
BY Amster & Levy
ATTORNEYS

INVENTOR.
MARTIN DVORIN
BY Amster & Levy
ATTORNEYS

United States Patent Office 3,181,872
Patented May 4, 1965

3,181,872
RECORD CHANGER CONTROL ASSEMBLY

Martin Dvorin, Rochester, N.Y., assignor, by mesne assignments, to General Electric Company, a corporation of New York Filed July 9, 1962, Ser. No. 208,263
12 Claims. (Cl. 274—15)

The present invention relates generally to record playing equipment and specifically to a control assembly for automatic record changer.

In the modern record changer it is necessary to provide for records of different diameters and designed to be played at different speeds. Therefore, in addition to the obvious requirement for removing the tone arm from a finished record and placing a new record on the turntable, it is necessary to provide means to place the tone arm at a number of different set-down locations spaced from the center of the turntable in order to properly engage the lead-in groove of records of a number of different sizes.

It is desirable that a record changer be provided which may automatically play records of a number of the different standard diameters. Records for home use are now made in three sizes, 7 inch diameter, 10 inch diameter and 12 inch diameter. It is desirable that a stack of records, of intermixed sizes, may be placed on a record changer and played automatically with the tone arm reliably being placed on the lead-in groove of each successive record. It is further desired that the changing mechanism will disengage themselves and halt further operations after the stack of records has been played or, alternatively, that the last record may be selectively repeated with the tone arm automatically moving to the lead-in groove of the record. It is advantageous to provide in a record changer means whereby the operator may manually place a record of one of the standard sizes on the turntable and whereby the tone arm may be automatically and selectively set down at the lead-in groove location of the record.

Generally, it is an object of the present invention to provide control means which provide the aforementioned desired advantages. Specifically, it is an object of the present invention to provide control means for a record changer such that records of more than one standard diameter may be placed on a record changer without the requirement for manual control.

It is a further object of the present invention to provide an index finger assembly which will register the size of a given record and will be effective to reliably control the set-down location of a tone arm such that it accurately engages the lead-in groove of that record.

It is still further within the contemplation of the present invention to provide control means on a record changer wherein the balance arm of the changer may be set to one of a number of positions in order to continuously repeat the last record on the turntable with the tone arm being properly and automatically placed on the lead-in groove of that record.

In accordance with one illustrative embodiment of the present invention, there is provided an automatic record changer of the type which includes a base, a turntable, a record spindle, a balance arm and a tone arm. Means are provided on the spindle to support a stack of records above the turntable and further means are provided to successively drop the lowermost record onto the turntable. Set down location selector means are operatively engaged with the tone arm for setting down the tone arm at one of a number of set-down locations corresponding to the position of the lead-in grooves of standard size records. In this environment there is provided an index finger assembly comprising an index finger pivotally mounted on the base of the changer in position to be engaged and deflected outwardly by records as they are dropped from the spindle support means onto the turntable. Index finger feeler means are provided for the measuring of the deflection of the index finger and are connected to the set-down location selector means to govern the set-down position of the tone arm. The index finger assembly further includes an index finger control element which is mounted on the base and engageable by the index finger when it is deflected outwardly by a record to absorb the kinetic energy of the index finger thereby to halt further travel thereof. An index finger retractor portion is provided on the control and is positioned to engage the index finger and move same radially outwardly in response to radially outward movement of the balance arm from its balancing position over the turntable. Deflection means on the balance arm, engageable with the control element, are provided for this function. In addition, positioning means are connected to the balance arm such that the index finger, through the control element, is selectively deflected to one of a number of positions in order to manually select the set-down location for the tone arm as determined through the feeler means.

The above brief description, as well as further objects, features and advantages of the present invention, will be best understood by reference to the following detailed description of one presently preferred illustrative embodiment when taken in conjunction with the accompanying drawings wherein.

Figures 1, 2:
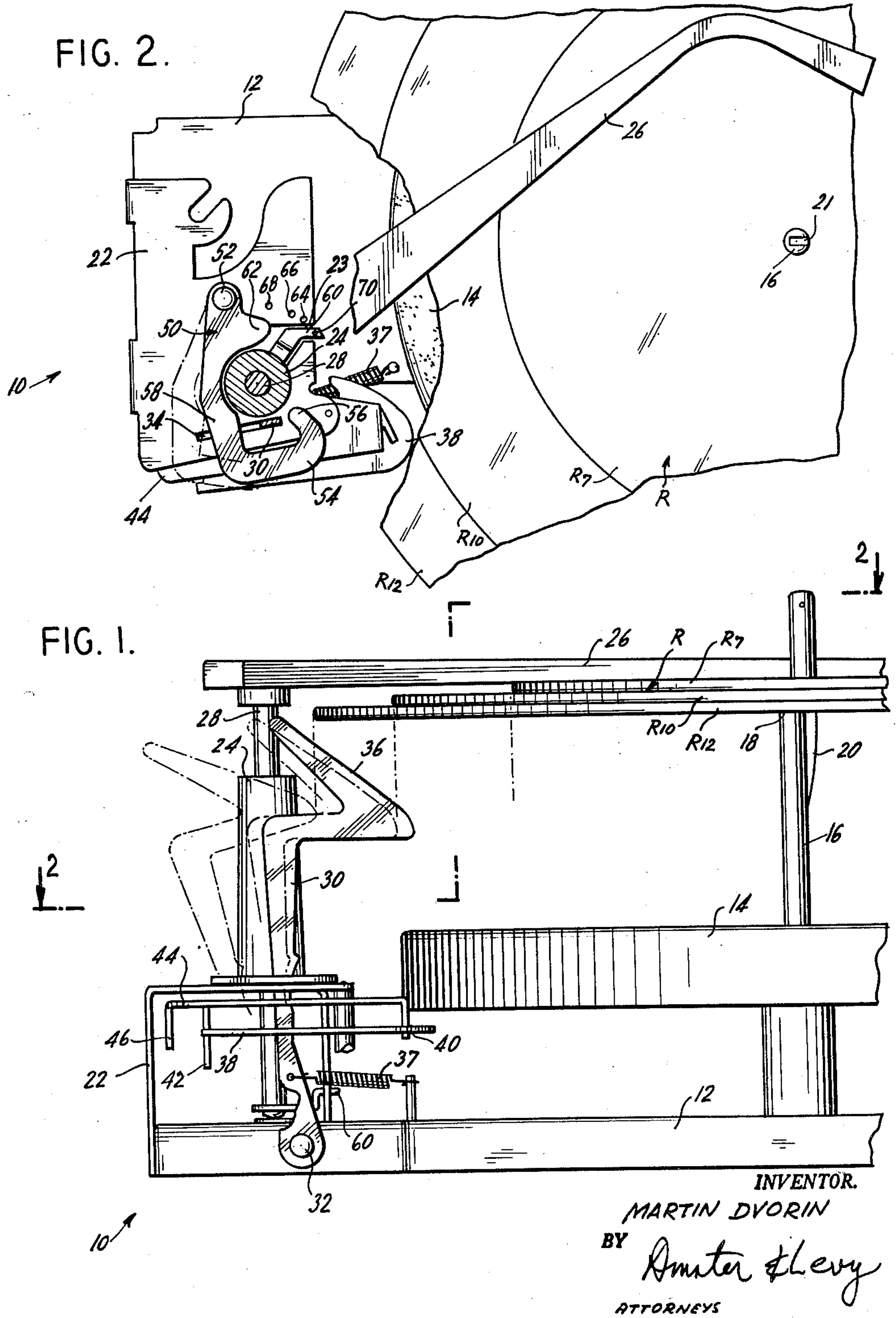
FIG. 1 is a partial elevational view of an automatic record player illustrating the index finger and control element means according to the present invention.
FIG. 2 is a partial plan view and partial section view of the assembly shown in FIG. 1 taken along the line 2—2 of FIG. 1 looking in the direction of the arrows.

Referring now to these drawings, there is shown a portion of an automatic record changer, generally designated by the numeral 10, which includes a base 12 upon which is mounted a turntable 14. Extending upwardly through the center of the turntable 14 and fixed to the base 12 is a record spindle 16 having a record supporting shelf 18, a push-off blade 20 and a slidable stop 21. Records, such as the records R, when supported on the shelf 18, may be pushed off therefrom successively by the action of the blade 20 in a manner well understood in the art.

Extending upwardly from the lower base 12 is secondary support or index bracket 22 upon which is mounted a balance arm column 24. The balance arm 26 is mounted on the balance arm column 24 by the interaction of the balance arm shaft 28 which is slidably and rotatably received within the column 24. A guide and camming arm 60 is secured to the lower end of the shaft 28 and rides in a vertical slot 23 formed in the index bracket 22. The slot 23 guides the balance arm 26 for solely vertical movement but permits rotation about the axis of the shaft 28 when the guide and camming arm 60 reaches the level of the top of the bracket 22. As may be seen in FIGS. 1 and 2, the balance arm 26 is positioned to overlie a stack of records R supported on the spindle shelf 18 and to balance those records. In addition to the foregoing standard elements of the record changer 10, but not shown in these drawings, there is provided a tone arm, a drive for the turntable 14, mechanisms to actuate the push-off blade 20 and mechanisms to raise and lower the tone arm from and onto the turntable and swing it radially between an inactive position removed from the turntable from a number of set-down locations on the turntable which set-down locations correspond to the position of the lead-in grooves of the standard sized phonograph records.

As may be seen in FIG. 1, records of different sizes may be automatically played on the record changer 10. The lowermost record R–12 represents a record having a 12 inch diameter; the next record R–10 represents a 10 inch diameter record; and the uppermost record R–7 represents a record of 7 inch diameter. Of course the records may be intermixed in any order.

An index finger 30 is pivoted to the base 12 at the pivot 32 and extends upwardly through an opening 34 formed in the index bracket 22. The index finger 30 is formed with an inclined portion 36 which is positioned in the path of falling records R as they are dropped from the spindle shelf 18 onto the turntable 14. As may be seen from the dotted vertical lines in FIG. 1, a 7 inch record falling onto the turntable 14 does not contact the index finger 30. However, a 10 inch record engages the edge of the inclined portion 36 of the index finger 30 and deflects same radially outwardly from the center of the turntable 14, in opposition to the biasing spring 37, to the position indicated by the first dotted line configuration of the index finger 30. A 12 inch record deflects the index finger 30 and deflects a greater amount to the position indicated by the outermost dotted line configuration of the index finger 30 in FIG. 1. Feeler means including a spring loaded pawl stop 38 are effective to register the amount of deflection of the index finger 30 and to transmit the thus gained information through the mechanisms which control the set-down location of the tone arm. The pawl stop is provided with a number of steps in a manner well known in the art such that it may pivot about its pivot 40 dependent upon the step of the pawl stop 38 to which the index finger 30 is deflected. The left hand end (in FIG. 1) of the pawl stop 38 engages a downward extension 42 of the indexing pawl 44 to control its movement. The indexing pawl 44 at its stop 46 is effective to control the set-down location of the tone arm. The mechanism for this operation is not shown herein for the sake of simplicity but is well known in standard record changer technology. These mechanisms consist generally of drive means to rotate and elevate the tone arm at selected times during the record changing cycle and a ratchet-like member having a number of ratchet teeth engageable with the stop 46, each tooth being effective to define a selected set-down location.

In accordance with the present invention, there is provided an index finger control element of generally C-shaped configuration and designated by the numeral 50. The control element 50 is pivoted at its upper end by the pivot 52 on the index bracket 22. The lower and forward extension 54 of the C-shaped control element 50 extends outwardly of and around the index finger 30. The lower and forward tip 56 of the C-shaped index finger and control element 50 is positioned to engage the inside edge of the index finger 30 as it extends upwardly through the opening 34 in the index bracket 22 and the bight portion 58 is positioned to engage the outer edge of the index finger 30. The interengagement of the control element 50 and the index finger 30 at two separate points on either side of the index finger provides two independent control functions as will be described below.

Figure 3:
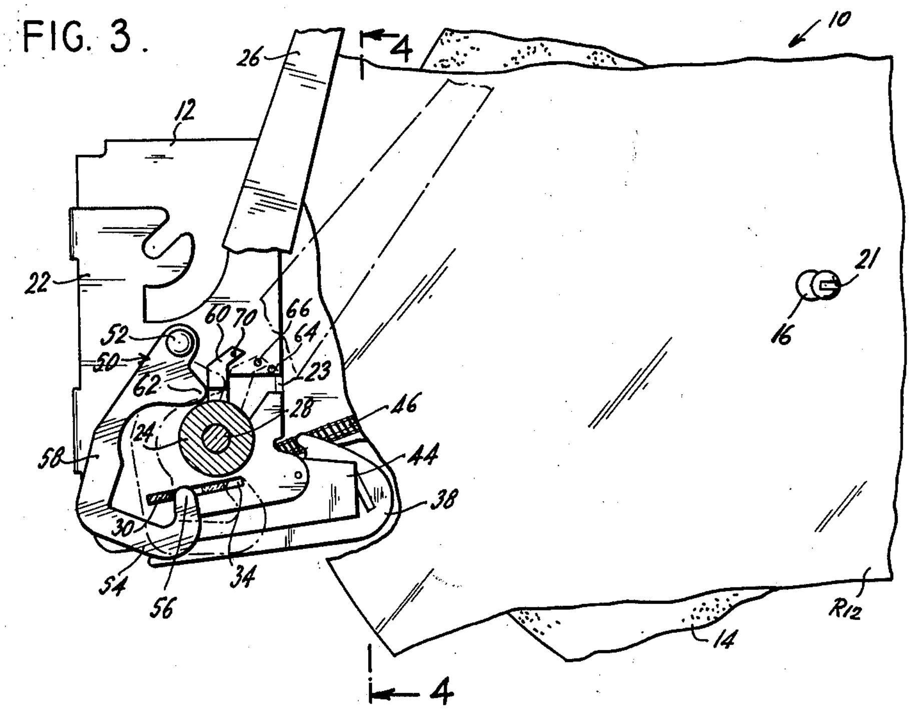
FIG. 3 is a view similar to that of FIG. 2 illustrating the record balance arm being removed to one of its rest positions in order to move the control element and thereby the index finger to one of its deflected positions.
Figure 4:
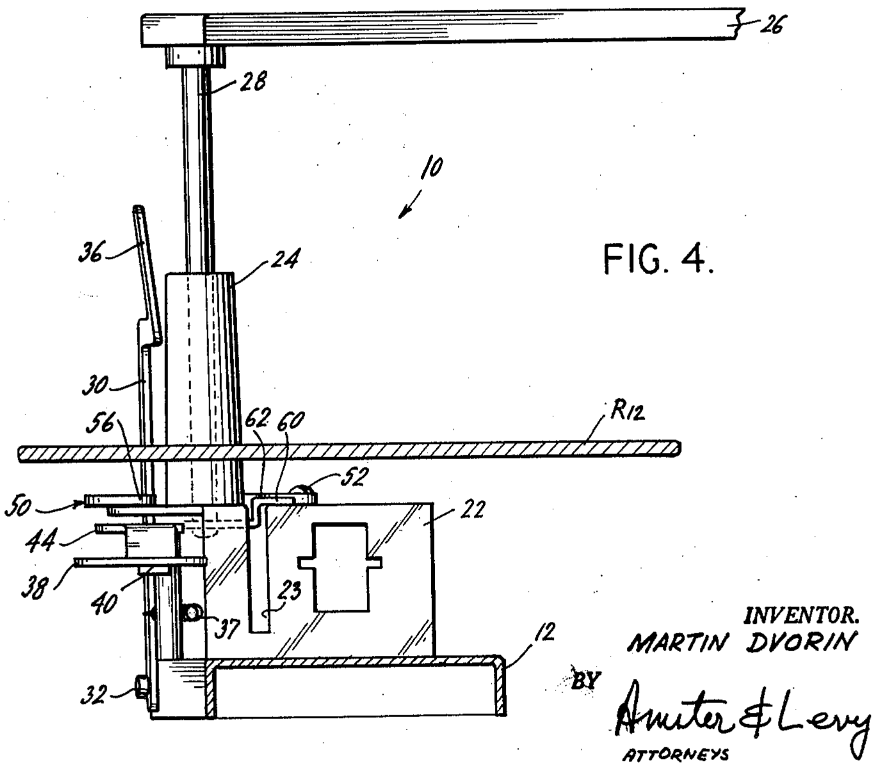
FIG. 4 is a front sectional view taken along the line 4—4 of FIG. 3 looking in the direction of the arrows from a position 90 degrees removed from that of FIG. 1.

It will be appreciated that movement of the control element 50, in a clockwise direction about its pivot 52 as seen in FIG. 2, will be effective to move the index finger 30 outwardly with respect to the center of the turntable 14. Such a clockwise rotation of the control element 50 is conveniently accomplished by the guide and camming arm 60 secured to and extending radially from the lower portion of the balance arm shaft 28 in engagement with a follower protrusion 62 formed adjacent the upper ends of the C-shaped control element 50 (see FIG. 3). It may be readily seen that when the balance arm 26 and balance arm shaft 28 are lifted upwardly and the guide and camming arm 60 is positioned above the level of the index bracket 22, the camming arm 60 will be in a position to contact the follower protrusion 62 of the control element 50. By rotating the balance arm 26 in the counterclockwise direction as seen in FIGS. 2 and 3, the camming arm 60 will be similarly rotated thereby engaging the follower protrusion 62 of the control element 50 to rotate the control element 50 in a clockwise direction about its pivot 52. This motion will be effective to draw the lower tip 56 of the control element 50 radially outwardly with respect to the center of the turntable 14 and thereby to displace the index finger 30. These movements may be appreciated by comparing the full line and dotted line positions of the elements in FIG. 3.

Since the radial displacement of the index finger 30 is effective, through the pawl stop 38 and the indexing pawl 44, to control the set-down location of the tone arm, the manual movement of the balance arm and thereby the camming arm 60 and the control element 50 may be alternatively employed to select the set-down location for the tone arm. Specifically, if the balance arm is raised such that the camming arm 60 is positioned above the upper level of the index bracket 22 and is rotated counterclockwise as shown in FIG. 3, the operator may select the amount of displacement of the control element 50 and thereby of the index finger 30. This is particularly advantageous wherein it is desired to repeat the last record positioned on the turntable. If there were to be a repeat play of the last record on the turntable, and if that record was of the 10 or 12 inch variety, without the provisions provided according to the present invention, the set-down location of the tone arm would automatically be that chosen for a 7 inch record since there would not be a falling record to displace the index finger 30 and thereby select the proper set-down location. However, by the proper placement of the balance arm 26 and, therefore, the control element 50, the index finger 30 may be displaced such that the tone arm will seek the proper set-down location. In order to make this manual selection for repeat play more convenient for the operator, there are provided three small depressions 64, 66, 68 in the upper surface of the bracket 22 and a mating dimple 70 in the under surface of the camming arm 60. The depressions 64, 66, 68 designate the locations for the camming arm 60 for the repeat of 7, 10 and 12 inch records respectively.

When the balance arm 26 and shaft 28 are raised and pivoted outwardly such that the dimple 70 is positioned within the first depression 64, the camming arm 60 approaches but does not contact the follower protrusion 62 of the control element 50 and, therefore, the index finger 30 is not displaced. In this position, the set-down selector mechanisms will be effective to set down the tone arm at the lead-in groove positions for 7 inch records. Similarly, if the dimple of the camming arm 60 is placed within either the 10 inch depression 66 or the 12 inch depression 68, the control element 50 will be displaced such as to move the index finger 30 to the positions it would occupy when displaced by either a 10 or 12 inch record respectively. Therefore, repeating cycles of the changer 10 will place the tone arm onto the lead-in position for 10 and 12 inch records respectively. The repeat play provision in the changer 10 may also advantageously be used to automatically set down the tone arm on a record which has been manually placed on the turntable 14.

It will be appreciated that the linkage of the balance arm movement to the outward movement of the index finger has particular advantages. It is desirable, prior to removing a record from the changer 10, that the index finger be displaced radially outwardly without contacting the record. It is also necessary that the balance arm be swung at a position in order to remove a record from the spindle 16. According to the constructions described herein, the simple motion of swinging the balance arm outwardly, which is a normal step in the removal of records from the changer 10, is effective to automatically displace the index finger 30.

The control element 50 provides another and highly significant function completely independent from the manual displacement of the index finger 30. It is quite possible, and often a bothersome reality, that the impart from a falling record will displace the index finger 30 beyond its desired location due to the kinetic energy imparted to the index finger. This in turn may cause a misplacement of the tone arm. Such a phenomenon may occur with 10 inch records where the index finger 30 is driven beyond the 10 inch position to that of a 12 inch record. Conversely, a 12 inch record may displace the index finger 30 with sufficient force that it sharply contacts the outward end of the slot 34 with sufficient speed that it is bounced quickly back to the 10 inch record prior to the time that the pawl stop 38 measures the displacement and transmits that information to the set-down location selector means of the tone arm.

The energy absorption attributes of the control element 50 obviates these undesirable results. Specifically, when a 10 inch record contacts the inclined surface 36 of the index finger 30 and displaces the index finger outwardly, the index finger 30 will contact the bight portion 58 of the control element 50 before it reaches the registering position intended for 12 inch records. The control element 50 serves as an energy absorbing stop for the index finger 30 by absorbing the kinetic energy of the moving index finger. As may be readily appreciated, the kinetic energy of the moving index finger 30 will be transferred to the control element 50 such that the index finger will stop movement and the control element will pivot about the point 52. The energy will quickly be dissipated due to the friction between the control element and the upper surface of the indexing bracket 22. Similarly, when a 12 inch record engages and displaces the index finger 30, it in turn displaces the control element 50 which, after the record has passed below the inclined portion 36 of the index finger 30, absorbs the kinetic energy of the index finger halting its further outward movement. This is effective to prevent the index finger from bouncing against the rear of the slot 34 and from popping into the 10 inch position prior to the time that the pawl stop 38 has registered for a 12 inch record.

It will be appreciated that there is provided in accordance with the present invention an index finger control element in association with an index finger and balance arm which is effective to selectively displace the index finger upon selective displacement of the balance arm and which is further effective to control the movement of the index finger such that it properly registers the diameter of records as they are dropped from the spindle shelf onto the turntable of an automatic record changer. The elements provided according to the invention are extremely simple and may be manufactured at a low cost and provide significant advances in the record changing art.

The foregoing is a description of one illustrative embodiment of the present invention. The invention may be incorporated in a variety of other embodiments without departing from the scope of the invention. Therefore, the following claims should be interpreted broadly to cover all embodiments of this invention.

What I claim is:

1. In an automatic record changer of the type including a base, a turntable, a spindle having means for supporting records above said turntable, a balance arm mounted on said base for balancing records supported on said spindle movable from a balancing position over said turntable and a plurality of rest positions removed from said turntable, a tone arm automatically movable from an inoperative position adjacent said turntable to a plurality of set-down locations on said turntable for contact with lead-in grooves of records of various sizes, and set-down location selector means for setting said tone arm down on a selected one of said set-down locations, an index finger assembly comprising an index finger mounted on said changer in position to be engaged and deflected radially outwardly from said turntable by records dropped from said supporting means onto said turntable, means biasing said index finger inwardly, and an index finger control element, feeler means for measuring the deflection of said index finger operatively connected to said set-down location selector means for governing the set-down location of said tone arm with respect to a given record dropped upon said turntable in response to the amount of deflection of said index finger, said index finger control element mounted on said base and engageable with said index finger when it is deflected by a record to absorb the kinetic energy of said index finger for halting further deflection thereof, said control element having an index finger retractor portion positioned to engage said index finger and move same outwardly in response to movement of said balance arm from said balance position outwardly to one of said rest positions, deflection means on said balance arm engageable with said control element for moving same in response to movement of said balance arm, and positioning means defining said outside positions of said balance arm for the movement of said control element and said index finger to selected deflected locations.

2. In an automatic record changer of the type including a base, a turntable, a spindle having means for supporting records above said turntable, a balance arm mounted on said base for balancing records supported on said spindle movable from a balancing position over said turntable and a plurality of rest positions removed from said turntable, a tone arm automatically movable from an inoperative position adjacent said turntable to a plurality of set-down locations on said turntable for contact with lead-in grooves of records of various sizes, and set-down location selector means for setting said tone arm down on a selected one of said set-down locations, an index finger assembly comprising an index finger mounted on said changer in position to be engaged and deflected radially outwardly from said turntable by records dropped from said supporting means on to said turntable, and an index finger control element, feeler means for measuring the deflection of said index finger operatively connected to said set-down location selector means for governing the set-down location of said tone arm with respect to a given record dropped upon said turntable in response to the amount of deflection of said index finger, said control element having an index finger retractor portion positioned to engage said index finger and move same outwardly in response to movement of said balance arm from said balance position outwardly to one of said rest positions, means on said balance arm engageable with said control element for moving same in response to movement of said balance arm, and positioning means defining said outside positions of said balance arm for the movement of said control element and said index finger to selected deflected locations.

3. In an automatic record changer of the type including a base, a turntable, a spindle having means for supporting records above said turntable, a balance arm mounted on said base for balancing records supported on said spindle movable from a balancing position over said turntable and a plurality of rest positions removed from said turntable, a tone arm automatically movable from an inoperative position adjacent said turntable to a plurality of set-down locations on said turntable for contact with lead-in grooves of records of various sizes, and set-down location selector means for setting said tone arm down on a selected one of said set-down locations, an index finger assembly comprising an index finger mounted on said changer in position to be engaged and deflected radially outwardly from said turntable by records dropped from said supporting means on to said turntable, and an index finger control element, feeler means for measuring the deflection of said index finger operatively connected to said set-down location selector means for governing the set-down location of said tone arm with respect to a given record dropped upon said turntable in response to the amount of deflection of said index finger, said control element having an index finger retractor portion positioned to engage said index finger and move same outwardly in response to movement of said balance arm from said balance position outwardly to one of said rest positions, and means on said balance arm engageable with said control element for moving same in response to movement of said balance arm.

4. In an automatic record changer of the type including a base, a turntable, a spindle having means for supporting records above said turntable, a balance arm mounted on said base for balancing records supported on said spindle movable from a balancing position over said turntable and a plurality of rest positions removed from said turntable, a tone arm automatically movable from an inoperative position adjacent said turntable to a plurality of set-down locations on said turntable for contact with lead-in grooves of records of various sizes, and set-down location selector means for setting said tone arm down on a selected one of said set-down locations, an index finger assembly comprising an index finger mounted on said changer in position to be engaged and deflected radially outwardly from said turntable by records dropped from said supporting means onto said turntable, an index finger control element, feeler means for measuring the deflection of said index finger operatively connected to said set-down location selector means for governing the set-down location of said tone arm with respect to a given record dropped upon said turntable in response to the amount of deflection of said index finger, said index finger control element movably mounted on said base to be engaged by said index finger when it is deflected by a record for absorbing the kinetic energy transferred to said index finger from a falling record for halting further deflection thereof, and means for returning said index finger and said control element to their respective initial positions during each cycle of operation of said changer.

5. In an automatic record changer of the type including a base, a turntable, a spindle having means for supporting records above said turntable, a balance arm mounted on said base for balancing records supported on said spindle movable from a balancing position over said turntable and a plurality of rest positions removed from said turntable, a tone arm automatically movable from an inoperative position adjacent said turntable to a plurality of set-down locations on said turntable for contact with lead-in grooves of records of various sizes, and set-down location selector means for setting said tone arm down on a selected one of said set-down locations, an index finger assembly comprising an index finger mounted on said changer in position to be engaged and deflected radially outwardly from said turntable by records dropped from said supporting means onto said turntable, and an index finger control element, feeler means for measuring the deflection of said index finger operatively connected to said set-down location selector means for governing the set-down location of said tone arm with respect to a given record dropped upon said turntable in response to the amount of deflection of said index finger, said index finger control element movably mounted on said base to be engaged by said index finger when it is deflected by a record for absorbing the kinetic energy transferred to said index finger by a record for halting further deflection thereof.

6. In a record changer including a base, a turntable, a tone arm, means for successively dropping records onto the turntable, means for selectively setting down the tone arm on the lead-in grooves of the records on the turntable, an index finger in position to be deflected by records as they are dropped onto the turntable, and means interconnecting said index finger and the set-down means for selecting the set-down location in response to the amount of displacement of said index finger, the improvement comprising a control element movably mounted on said base and normally located in a starting position so that it is engaged and moved by said index finger as it is displaced by a falling record, said control element being of a mass to absorb the kinetic energy of said index finger so that movement of said index finger is substantially halted upon completion of contact between a falling record and said index finger.

7. In a record changer including a base, a turntable, a tone arm, means for successively dropping records onto the turntable, means for selectively setting down the tone arm on the lead-in grooves of the records on the turntable, an index finger in position to be deflected by records as they are dropped onto the turntable, and means interconnecting said index finger and the set-down means for selecting the set-down location in response to the amount of displacement of said index finger, the improvement comprising a control element movably mounted on said base and normally located in a starting position so that it is engaged and moved by said index finger as it is displaced by a falling record, said control element being of a mass to absorb the kinetic energy of said index finger so that movement of said index finger is substantially halted upon completion of contact between a falling falling record and said index finger, and friction means for absorbing the energy transferred to said control element.

8. In a record changer including a base, a turntable, a tone arm, means for successively dropping records onto the turntable, means for selectively setting down the tone arm on the lead-in grooves of the records on the turntable, an index finger in position to be deflected by records as they are dropped onto the turntable, and means interconnecting said index finger and the set-down means for selecting the set-down location in response to the amount of displacement of said index finger, the improvement comprising a control element movably mounted on said base and normally located in a starting position so that it is engaged and moved by said index finger as it is displaced by a falling record, said control element being of a mass to absorb the kinetic energy of said index finger so that movement of said index finger is substantially halted upon completion of contact between a falling record and said index finger, and means for returning said control element to its original position during each cycle of said record changer.

9. In a record changer including a base, a turntable, a tone arm, means for successively dropping records onto the turntable, means for selectively setting down the tone arm on the lead-in grooves of the records on the turntable, an index finger in position to be deflected by records as they are dropped onto the turntable, and means interconnecting said index finger and the set-down means for selecting the set-down location in response to the amount of displacement of said index finger, the improvement comprising a control element movably mounted on said base and normally located in a starting position so that it is engaged and moved by said index finger as it is displaced by a falling record, said control element being of a mass sufficient to absorb the kinetic energy of said index finger so that movement of said index finger is substantially halted upon completion of contact between a falling record and said index finger, friction means for absorbing the energy transferred to said control element and means for returning said control element to its original position during each cycle of said record changer.

10. In a record changer including a base, a turntable, a tone arm, means for successively dropping records onto the turntable, means for selectively setting down the tone arm on the lead-in grooves of the records on the turntable, a balance arm movable between a balance position over said turntable and a plurality of rest positions removed from said turntable, an index finger in position to be deflected by records as they are dropped onto the turntable, and means interconnecting said index finger and the set-down means for selecting the set-down location in response to the amount of displacement of said index finger, the improvement comprising a control element movably mounted on said base and positioned to engage and deflect said index finger, and means interconnecting said balance arm and said control element for moving said control element and deflecting said index finger in response to movement of said balance arm to one of said rest positions, said rest positions governing the amount of deflection of said index finger therefor to govern the set-down location of said tone arm.

11. In a record changer including a base, a turntable, a tone arm, means for successively dropping records onto the turntable, means for selectively setting down the tone arm on the lead-in grooves of the records on the turntable, a balance arm movable between a balance position over said turntable and a rest position removed from said turntable, an index finger in position to be deflected by records as they are dropped onto the turntable, and means interconnecting said index finger and the set-down means for selecting the set-down location in response to the amount of displacement of said index finger, the improvement comprising a control element movably mounted on said base and positioned to engage and deflect said index finger, and means interconnecting said balance arm and said control element for moving said control element and deflecting said index finger in response to movement of said balance arm to said rest position.

12. In an automatic record changer of the type including a base, a turntable, a spindle having means for supporting records above said turntable, a balance arm mounted on said base for balancing records supported on said spindle movable from a balancing position over said turntable and a rest position removed from said turntable, a tone arm automatically movable from an inoperative position adjacent said turntable to a plurality of set-down locations on said turntable for contact with lead-in grooves of records of various sizes, and set-down location selector means for setting said tone arm down on a selected one of said set-down locations, an index finger assembly comprising an index finger mounted on said changer in position to be engaged and deflected by records dropped from said supporting means onto said turntable, and an index finger control element, feeler means for measuring the deflection of said index finger operatively connected to said set-down location selector means for governing the set-down location of said tone arm with respect to a given record dropped upon said turntable in response to the amount of deflection of said index finger, said control element having an index finger retractor portion positioned to engage said index finger and deflect same in response to movement of said balance arm from said balance position outwardly to said rest position, means on said balance arm engageable with said control element for moving same in response to movement of said balance arm.

References Cited by the Examiner

UNITED STATES PATENTS 2,794,647 6/57 Guest ---------------- 274—15

NORTON ANSHER, *Primary Examiner.*

EMIL G. ANDERSON, *Examiner.*